United States Patent [19]

Usui

[11] 4,266,577

[45] May 12, 1981

[54] COLLARED FUEL INJECTION PIPE FOR ENGINES

[75] Inventor: Masayoshi Usui, Numazu, Japan

[73] Assignee: Usui Kokusai Sangyo Kabushiki Kaisha, Shizuoka, Japan

[21] Appl. No.: 60,730

[22] Filed: Jul. 25, 1979

[51] Int. Cl.³ .................... F16L 9/00

[52] U.S. Cl. .................... 138/109; 138/172

[58] Field of Search .................... 138/172, 109, 96 R; 285/115, 258; 16/2, 108

[56] References Cited

U.S. PATENT DOCUMENTS

| | | | |
|---|---|---|---|
| 3,206,075 | 9/1965 | Scholle | 285/158 |
| 3,217,093 | 11/1965 | Colorato | 138/109 |
| 3,559,730 | 2/1971 | Denjean | 285/158 |
| 3,782,450 | 1/1974 | Swozil | 285/115 |
| 4,156,299 | 5/1979 | Kovac | 138/106 |

*Primary Examiner*—John W. Shepperd

*Attorney, Agent, or Firm*—Anthony J. Casella; Michael A. Stallman

[57] ABSTRACT

A tapered fuel injection pipe with a collar pressed and fitted below the neck is provided with a fine slit between the inside surface of the collar and the outside surface of a tapered part of the injection pipe in the free end zone of the collar.

By providing such fine slit, the strength against breakage is remarkably improved.

2 Claims, 5 Drawing Figures

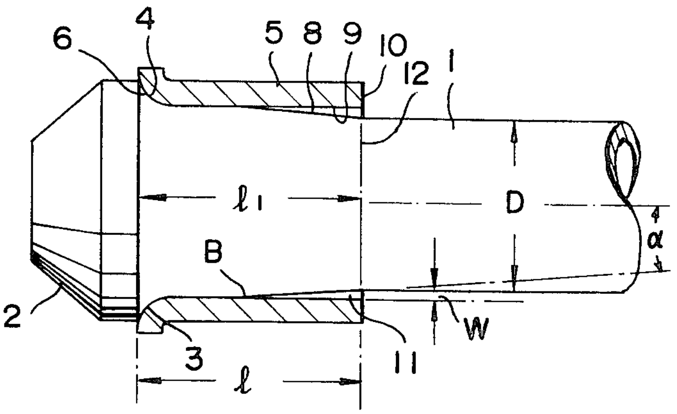
FIG. 3
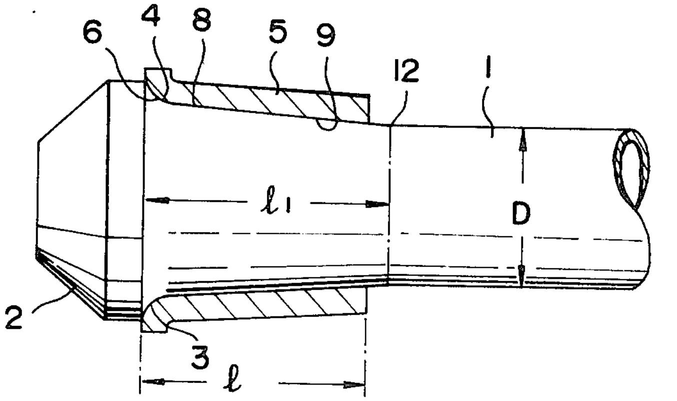
FIG. 4
FIG. 5
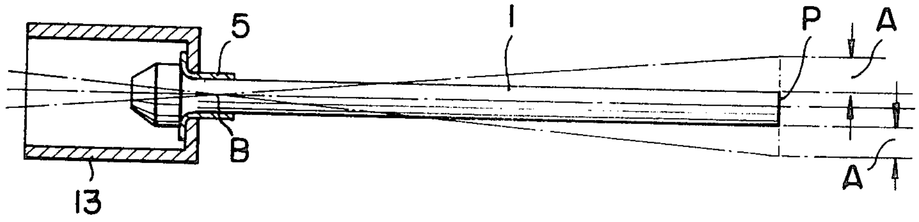

COLLARED FUEL INJECTION PIPE FOR ENGINES

BACKGROUND OF THE INVENTION

1. Field of the Invention

This invention relates to a collared fuel injection pipe for engines.

2. Description of the Prior Art

For a conventional fuel injection pipe for automobile engines, usually a drawn fine pipe of an outside diameter of 6 to 8 mm and inside diameter of 1.6 to 2 mm is used, a head 2 is made by a cold buckling method and a neck 3 is formed in the boundary part of the head hardened by buckling and the pipe shaft part not buckled. Generally, in case the injection pipe is vibrated, the neck 3 will become a fulcrum of the vibration and will be therefore often unavoidably broken. Therefore, since long ago, as a reinforcing measure, as shown in FIG. 1, the neck has been reinforced by the pressed contact of the curved surface 4 of the neck 3 and the curved surface 6 of a collar 5 with each other. However, as there is a clearance on the entire outside surface of the pipe except the pressed contact part between the curved surfaces 4 and 6, the fulcrum of the vibration will be located near the neck which will be thus likely to be broken.

If the collar 5 can be pressed and fitted to the outside surface of the pipe below the neck, even the conventional pipe will be able to be expected to be strengthened. However, it has been impossible due to a very high friction resistance to press and fit the collar 5 through the long pipe 1 extending below the neck. Shown in FIG. 2 is a type known as a Benz type having a step 7 on the pipe 1 near one end of the collar 5. It is shown together with the conventional product of FIG. 1 for comparison with the product of the present invention.

SUMMARY OF THE INVENTION

The present invention is to provide a collared fuel injection pipe for engines simple in the structure and high in the strength against breakage by eliminating such defects as are mentioned above.

According to the present invention, a collared fuel injection pipe for engines with a collar pressed and fitted below the neck is characterized by being provided with a fine slit between the inside surface of the collar and the outside surface of the injection pipe.

Further objects, advantages and features of the present invention will become more fully apparent from a detailed consideration of the arrangement and construction of the constituent parts as set forth in the following specification taken together with the accompanying drawings.

BRIEF DESCRIPTION OF THE DRAWINGS

FIG. 3 is a partly sectioned side view of a fuel injection pipe embodying the present invention.

FIG. 4 is a partly sectioned side view of a reference example for explaining the present invention.

FIG. 5 is a schematic view for explaining the operation of the present invention.

DETAILED DESCRIPTION OF PREFERRED EMBODIMENTS

Figure 1:
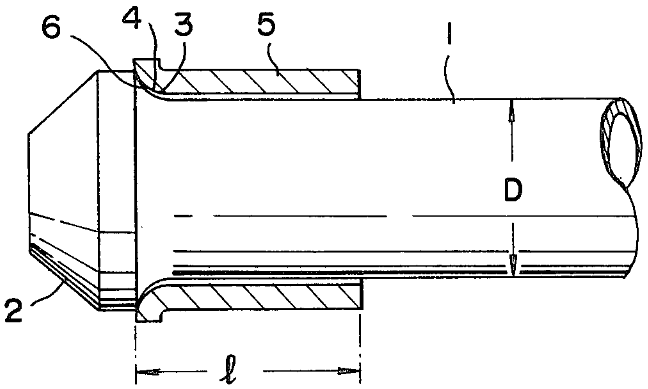
FIG. 1 PRIOR ART
FIGS. 1 and 2 are partly sectioned side view of conventional collared fuel injection pipes for engines.

The present invention shall be explained with reference to FIGS. 3 and 4.

A pipe shaft part 1 of a tapered injection pipe having an outside diameter D has a head 2 and is fitted with a collar 5.

The curved surface 6 of the collar 5 and the curved surface 6 of a neck 3 of the injection pipe are pressed into contact with each other either by pressing and fitting the collar onto tapered part having the head 2 formed in advance or by fitting the collar 5 onto the tapered part and then forming the head 2. The outside surface 8 of the tapered part below the neck 3 and the inside surface 9 of the fitted collar are pressed into contact with each other toward the neck 3 with a boundary B as a limit and a fine slit 11 is provided toward the free end 10 of the collar 5.

By the way, in the drawings, l is the length of the collar, $l_1$ is the length below the neck of the tapered part of the injection pipe, W is the width of the slit 11 at the free end 10 and $\alpha$ is the angle of inclination of the tapered part.

Now, experiments were made by the method shown in FIG. 5 by making D=6 mm, $\alpha=52'$, W=0.04 to 0.08 mm and $l_1=10$ mm, positioning the boundary B in the intermediate part of the collar 5, fastening and fixing the head 2 with a box nut 13 and varying the length l of the collar 5. The results are shown in the below mentioned table.

Figure 2:
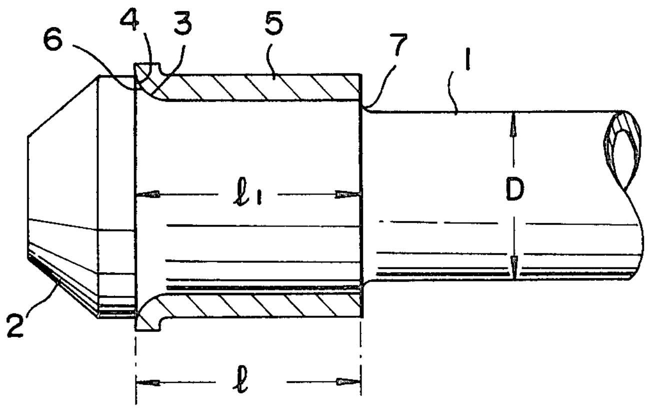
FIG. 2 PRIOR ART

By the way, in the table, FIGS. 1 and 2 are of test values of conventional products. Each of the tested injection pipes was made by buckling a thick-walled fine pipe made by laminating six steel sheets and integrally bonding respective adjacent laminations with brazed layers. The strengths and test values shown in the following table were obtained by using such same material. The test value shows the number of repetitions until the product was broken by repeating vibrations in both ways in the following manner:

| | |
|---|---|
| Length of the tested product (the length from the pressed contact boundary B to the point P giving vibrations) | 115mm |
| Stress amplitude A | 2mm |
| Repeating rate | 2.520 r.p.m. |
| Box nut fastening torque | 300cm-kg |

Strength Tests (Numbers of repetations until breakage)

| Product illustrated FIG. 1 Injection pipe Pressed contact part of the collar | Standard type Neck | Product illustrated in FIG. 2 Benz type Pressed contact on the entire inside surface | Product illustrated in FIG. 3 (Product of the present invention) Tapered type | | | | | Product Illustrated in FIG. 4 Pressed contact on the entire inside surface |
|---|---|---|---|---|---|---|---|---|
| Test No. l | 10mm | 10mm | 16mm | 13mm | 10mm | 8mm | 6mm | 8mm |
| 1 | 38.419 | 40.443 | 59.424 | 54.790 | 85.176 | 71.239 | 67.460 | 45.329 |
| 2 | 26.676 | 51.927 | 60.774 | 64.880 | 88.553 | 53.591 | 57.053 | 39.421 |
| 3 | 39.452 | 37.814 | 49.664 | 70.027 | 71.820 | 73.417 | 51.530 | 46.662 |
| 4 | 41.872 | 42.535 | 46.924 | 50.024 | 86.486 | 57.119 | 61.820 | 52.642 |
| 5 | 34.942 | 46.465 | 59.130 | 60.417 | 76.074 | 74.264 | 48.848 | 48.764 |
| 6 | 20.124 | 48.660 | 52.219 | 65.046 | 81.274 | 70.227 | 55.818 | 40.232 |
| 7 | 28.541 | 41.055 | 38.233 | 51.256 | 72.450 | 55.355 | 55.129 | 46.987 |
| 8 | 45.826 | 38.350 | 49.826 | 63.852 | 80.615 | 67.297 | 64.407 | 39.232 |
| 9 | 39.251 | 39.269 | 39.651 | 70.343 | 89.460 | 62.208 | 48.913 | 38.256 |
| 10 | 40.586 | 45.368 | 60.524 | 60.036 | 70.157 | 58.782 | 60.812 | 47.442 |
| Average value | 37.569 | 43.189 | 51.637 | 62.067 | 80.206 | 64.350 | 57.279 | 44.496 |
| Difference between maximum value and minimum value | 25.704 | 14.113 | 22.541 | 19.087 | 19.303 | 18.909 | 16.812 | 13.386 |

As understood from the above table:

(A) The type (FIG. 3) in which the fine slit 11 is provided toward the end 10 from the inner part of the collar 5 is stronger than the type (FIG. 4) in which the entire inside surface 9 of the collar is pressed into contact with the tapered outside surface 8 of the tapered injection pipe. Particularly, by comparing the type (l=8 mm) of FIG. 4 with the type (l=8 mm) of FIG. 3, the cause of the strengthening can be found. By the way, with the collars of other lengths l, the same results are obtained.

(B) In the type (FIG. 3) in which the fine slit 11 is provided toward the free end 10 from the inner part of the collar, the strength is different depending on the length of the collar 5 and shows a tendency to become higher as the free end 10 of the collar approaches the taper end 12 of the pipe.

By the way, in case the length $l_1$ of the tapered part below the neck was varied, as the $l_1$ became shorter than 10 mm, the strength was recognized to reduce but, on the contrary, even when it was somewhat longer, the same tendency as of the product of 10 mm was recognized.

The reason why the product of the present invention derives such effects is considered to be that, though the injection pipe and collar are respectively manufactured with the utmost care, as there are some manufacturing errors, in case the collar is fitted, the pressed contact boundary B on the inside surface 9 of the collar will not be in the plane intersecting the tapered part vertically to the pipe axis part and will be formed to be wave-shaped, the pressed contact surface of the inside surface 9 of the collar and the outside surface 8 of the tapered part will form the fine slit 11 in the lengthwise direction of the pipe of the tapered part, the contact boundary point will move with the slightest vibration and the stress repeating fulcrum on the tapered pipe side will be thereby three-dimensionally moved to develop a strengthening function.

Even if the present invention is applied to a conventional thick-walled drawn fine pipe instead of the laminated pipe having the above described brazed layers, the same effects will be recognized.

While the present invention has been described with reference to particular embodiments thereof, it will be understood that numerous modifications may be made by those skilled in the art without actually departing from the spirit and scope of the invention as defined in the appended claims.

I claim:

1. A collared pipe for channeling fluid, injected under pressure, which resists breakage due to vibration comprising:

a longitudinally extending injection tube, with one end thereof including a head portion, and with the juncture between said head portion and the remainder of the tube defining a neck, with the outside surface of said tube being tapered in diameter from said neck to a point intermediate the length of said tube; and a collar of generally tubular configuration disposed about said injection tube extending from said neck towards the opposed end of said tube, said collar being press fit to said tube adjacent said neck and having a constant inner diameter, with the tapered outer surface of said injection tube diverging from the inner surface of said collar to define a gap, whereby a circumferential contact boundary, corresponding to the outer surface of said tube where said gap is initially defined, functions as a fulcrum of vibration, and wherein said circumferential contact boundary shifts as a function of the vibration such that repeated localized stresses are minimized thereby inhibiting breakage of said tube.

2. A pipe as recited in claim 1 wherein the length of said collar substantially corresponds to the length of the tapered portion of said tube.

* * * * *